US012131176B2

(12) United States Patent
Todorov et al.

(10) Patent No.: US 12,131,176 B2
(45) Date of Patent: Oct. 29, 2024

(54) CLUSTER LEADER SELECTION VIA PING TASKS OF SERVICE INSTANCES

(71) Applicant: VMware, Inc., Palo Alto, CA (US)

(72) Inventors: Atanas Todorov, Sofia (BG); Ventsyslav Raikov, Sofia (BG)

(73) Assignee: VMware LLC, Palo Alto, CA (US)

( * ) Notice: Subject to any disclaimer, the term of this patent is extended or adjusted under 35 U.S.C. 154(b) by 467 days.

(21) Appl. No.: 17/579,342

(22) Filed: Jan. 19, 2022

(65) Prior Publication Data

US 2023/0229475 A1 Jul. 20, 2023

(51) Int. Cl.
G06F 9/455 (2018.01)
G06F 9/48 (2006.01)

(52) U.S. Cl.
CPC ........ *G06F 9/45558* (2013.01); *G06F 9/4881* (2013.01); *G06F 2009/4557* (2013.01)

(58) Field of Classification Search
CPC .............. G06F 9/45558; G06F 9/4881; G06F 2009/4557
See application file for complete search history.

(56) References Cited

U.S. PATENT DOCUMENTS

| | | | | |
|---|---|---|---|---|
| 7,461,130 B1* | 12/2008 | AbdelAziz | .......... | H04L 67/1051 709/208 |
| 7,788,522 B1* | 8/2010 | Abdelaziz | ............. | H04L 67/104 709/209 |
| 9,256,467 B1* | 2/2016 | Singh | .................... | G06F 9/5077 |
| 10,454,754 B1* | 10/2019 | Patel | .................... | H04L 41/0654 |
| 11,108,629 B1* | 8/2021 | Cahyadi | .............. | G06F 9/45558 |
| 11,663,096 B1* | 5/2023 | Sharma | ..................... | G06F 3/06 714/4.11 |
| 2006/0053216 A1* | 3/2006 | Deokar | ................. | G06F 15/173 709/223 |
| 2015/0378761 A1* | 12/2015 | Sevigny | ................... | G06F 11/16 718/1 |
| 2015/0378853 A1* | 12/2015 | Sevigny | ............... | G06F 11/203 714/4.11 |
| 2017/0364423 A1* | 12/2017 | Peng | ...................... | G06F 11/203 |
| 2018/0115456 A1* | 4/2018 | Bendre | .............. | H04L 41/0663 |
| 2018/0219946 A1* | 8/2018 | Farrahi Moghaddam | ................... | H04L 67/1095 |
| 2021/0021671 A1* | 1/2021 | Zhou | .................... | H04L 41/0668 |
| 2022/0012080 A1* | 1/2022 | Shepherd | ............ | G06F 9/45545 |
| 2022/0283846 A1* | 9/2022 | Zhang | .................... | G06F 9/4881 |
| 2023/0195522 A1* | 6/2023 | Xiao | ...................... | G06F 9/5072 718/104 |

(Continued)

*Primary Examiner* — Benjamin C Wu
(74) *Attorney, Agent, or Firm* — Kim & Stewart LLP

(57) ABSTRACT

An example method of executing a periodic task of a service having service instances replicated across hosts in a cluster of a virtualized computing system, the service instances executing in pods implemented by virtual machines (VMs) on the hosts, the method including: persisting, by ping tasks of the service instances, records in a pod information table of a database, the records including pod identifiers of the pods and leader indicators; determining, by a first ping task, a leaderless condition in that the leader indicator in each of the records is false; setting to true, by the first ping task in response to the leaderless condition, the leader indicator in a first record having a first pod identifier for a first pod in which the first ping task executes; and executing the periodic task in the first pod to the exclusion of each other of the pods.

20 Claims, 7 Drawing Sheets

(56) References Cited

U.S. PATENT DOCUMENTS

| | | | |
|---|---|---|---|
| 2023/0205505 A1* | 6/2023 | Chen | G06F 9/455 |
| | | | 717/174 |
| 2023/0224243 A1* | 7/2023 | Barak | H04W 40/32 |
| | | | 370/351 |
| 2023/0305876 A1* | 9/2023 | Sharma | G06F 11/0793 |
| 2024/0118935 A1* | 4/2024 | Wang | G06F 9/5044 |
| 2024/0146630 A1* | 5/2024 | Krishna | H04L 43/10 |

* cited by examiner

312

| Pod ID 402 | Last Ping Time 404 | Leader 406 |
|---|---|---|
| Pod 1 | T1 | False |
| Pod 2 | T2 | False |
| Pod 3 | T3 | True |
| Pod 10 | T10 | False |
| Pod 11 | T11 | False |
| Pod 12 | T12 | False |

Unique Index

Active Pod Records: Pod 1, Pod 2, Pod 3
Stale Pod Records: Pod 10, Pod 11, Pod 12

CLUSTER LEADER SELECTION VIA PING TASKS OF SERVICE INSTANCES

Applications today are deployed onto a combination of virtual machines (VMs), containers, application services, physical servers without virtualization, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. A user, or automated software on behalf of an Infrastructure as a Service (IaaS), interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications.

For deploying applications in an SDDC, a container orchestrator (CO) known as Kubernetes® has gained in popularity among application developers. Kubernetes provides a platform for automating deployment, scaling, and operations of application containers across clusters of hosts. It offers flexibility in application development and offers several useful tools for scaling. In a Kubernetes system, containers are grouped into logical unit called "pods" that execute on nodes in a cluster (also referred to as "node cluster"). Containers in the same pod share the same resources and network and maintain a degree of isolation from containers in other pods. The pods are distributed across nodes of the cluster. In a typical deployment, a node includes an operating system (OS), such as Linux®, and a container engine executing on top of the OS that supports the containers of the pod.

An application can be implemented as a plurality of services executing in containers (e.g., microservices). Multiple instances of each service can be deployed across a plurality of nodes using replication. Kubernetes provides load balancing across service instances to provide high availability and scalability. Some services need to perform periodic tasks (e.g., scheduled tasks) that fetch or synchronize data from other service(s), check for expired tasks, and the like. These periodic tasks should not be executed concurrently on multiple instances of the service for performance reasons and to avoid race conditions. Kubernetes, however, does not provide a mechanism for executing periodic tasks in only one node for a service replicated across a plurality of nodes.

SUMMARY

Embodiments include a method of executing a periodic task of a service having service instances replicated across hosts in a cluster of a virtualized computing system, the service instances executing in pods implemented by virtual machines (VMs) on the hosts. The method includes: persisting, by ping tasks of the service instances, records in a pod information table of a database, the records including pod identifiers of the pods and leader indicators, the database configured such that the leader indicator in only one of the records can be set to true; determining, by a first ping task of the ping tasks, a leaderless condition in that the leader indicator in each of the records is false; setting to true, by the first ping task in response to the leaderless condition, the leader indicator in a first record of the records having a first pod identifier of the pod identifiers for a first pod of the pods in which the first ping task executes; and executing the periodic task in the first pod to the exclusion of each other of the pods.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

FIG. 4 is a block diagram depicting a pod information table according to embodiments.

DETAILED DESCRIPTION

Figure 1:
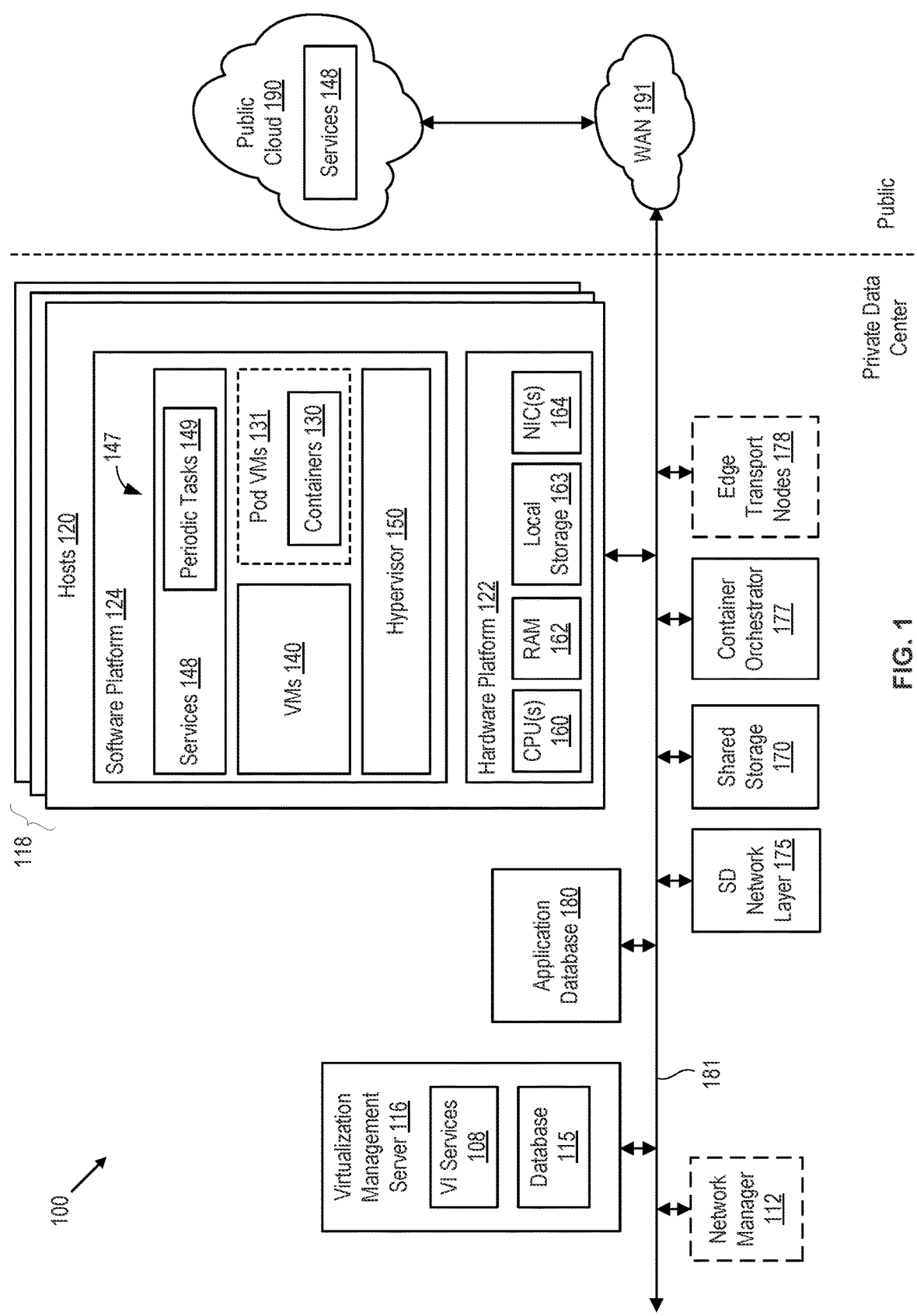
FIG. 1 is a block diagram of a virtualized computing system in which embodiments described herein may be implemented.

FIG. 1 is a block diagram of a virtualized computing system 100 in which embodiments described herein may be implemented. Virtualized computing system 100 can be a multi-cloud system having a private data center in communication with a public cloud 190. In embodiments, the private data center can be controlled and administered by a particular enterprise or business organization, while public cloud 190 is operated by a cloud computing service provider and exposed as a server available to account holders ("tenants"). The operator of the private data center can be a tenant of public cloud 190 along with a multitude of other tenants. The private data center is also known variously as an on-premises data center, on-premises cloud, or private cloud. The multi-cloud system is also known as a hybrid cloud system. In embodiments, virtualized computing system can be a single-cloud system, where the techniques described herein are performed in one cloud system (e.g., private data center or public cloud 190). Public cloud 190 can include infrastructure similar to that described below for the private data center.

The private data center is a software-defined data center (SDDC) that includes hosts 120. Hosts 120 may be constructed on server-grade hardware platforms such as an x86 architecture platforms. One or more groups of hosts 120 can be managed as clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 181. Physical network 180 enables communication between hosts 120 and between other components and hosts 120 (other components discussed further herein).

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA Services 148 of an application 147 execute in VMs 140 and includes periodic tasks 149. In embodiments, application 147 can also include services 148 executing in public cloud 190. Application 147 includes an application database 180 for maintaining state for services 148. While application database 180 is shown logically separate for purposes of explanation, application database 180 comprises software executing in VMs 140 and/or pod VMs 131 (discussed below).

Virtualized computing system 100 is configured with a software-defined (SD) network layer 175. SD network layer 175 includes logical network services executing on virtualized infrastructure of hosts 120. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches and logical routers, as well as logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to a wide area network (WAN) 191 (e.g., a corporate network, the public Internet, etc.). Edge transport nodes 178 can include a gateway (e.g., implemented by a router) between the internal logical networking of host cluster 118 and the external network. The private data center can interface with public cloud 190 through edge transport nodes 178 and WAN 191. Edge transport nodes 178 can be physical servers or VMs. Virtualized computing system 100 also includes physical network devices (e.g., physical routers/switches) as part of physical network 181, which are not explicitly shown.

Virtualization management server 116 is a physical or virtual server that manages hosts 120 and the hypervisors therein. Virtualization management server 116 installs agent(s) in hypervisor 150 to add a host 120 as a managed entity. Virtualization management server 116 can logically group hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118. While only one virtualization management server 116 is shown, virtualized computing system 100 can include multiple virtualization management servers each managing one or more host clusters.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents in hypervisor 150 to add a host 120 as a managed entity, referred to as a transport node. One example of an SD networking platform that can be configured and used in embodiments described herein as network manager 112 and SD network layer 175 is a VMware NSX® platform made commercially available by VMware, Inc. of Palo Alto, CA In other embodiments, SD network layer 175 is orchestrated and managed by virtualization management server 116 without the presence of network manager 112.

Virtualization management server 116 can include various virtual infrastructure (VI) services 108. VI services 108 can include various services, such as a management daemon, distributed resource scheduler (DRS), high-availability (HA) service, single sign-on (SSO) service, and the like. VI services 108 persist data in a database 115, which stores an inventory of objects, such as clusters, hosts, VMs, resource pools, datastores, and the like. Users interact with VI services 108 through user interfaces, application programming interfaces (APIs), and the like to issue commands, such as forming a host cluster 118, configuring resource pools, define resource allocation policies, configure storage and networking, and the like.

In embodiments, services 148 can also execute in containers 130. In embodiments, hypervisor 150 can support containers 130 executing directly thereon. In other embodiments, containers 130 are deployed in VMs 140 or in specialized VMs referred to as "pod VMs 131." A pod VM 131 is a VM that includes a kernel and container engine that supports execution of containers, as well as an agent (referred to as a pod VM agent) that cooperates with a controller executing in hypervisor 150. In embodiments, virtualized computing system 100 can include a container orchestrator 177. Container orchestrator 177 implements an orchestration control plane, such as Kubernetes®, to deploy and manage applications or services thereof in pods on hosts 120 using containers 130. Container orchestrator 177 can include one or more master servers configured to command and configure controllers in hypervisors 150. Master server(s) can be physical computers attached to network 180 or implemented by VMs 140/131 in a host cluster 118.

Figure 2:
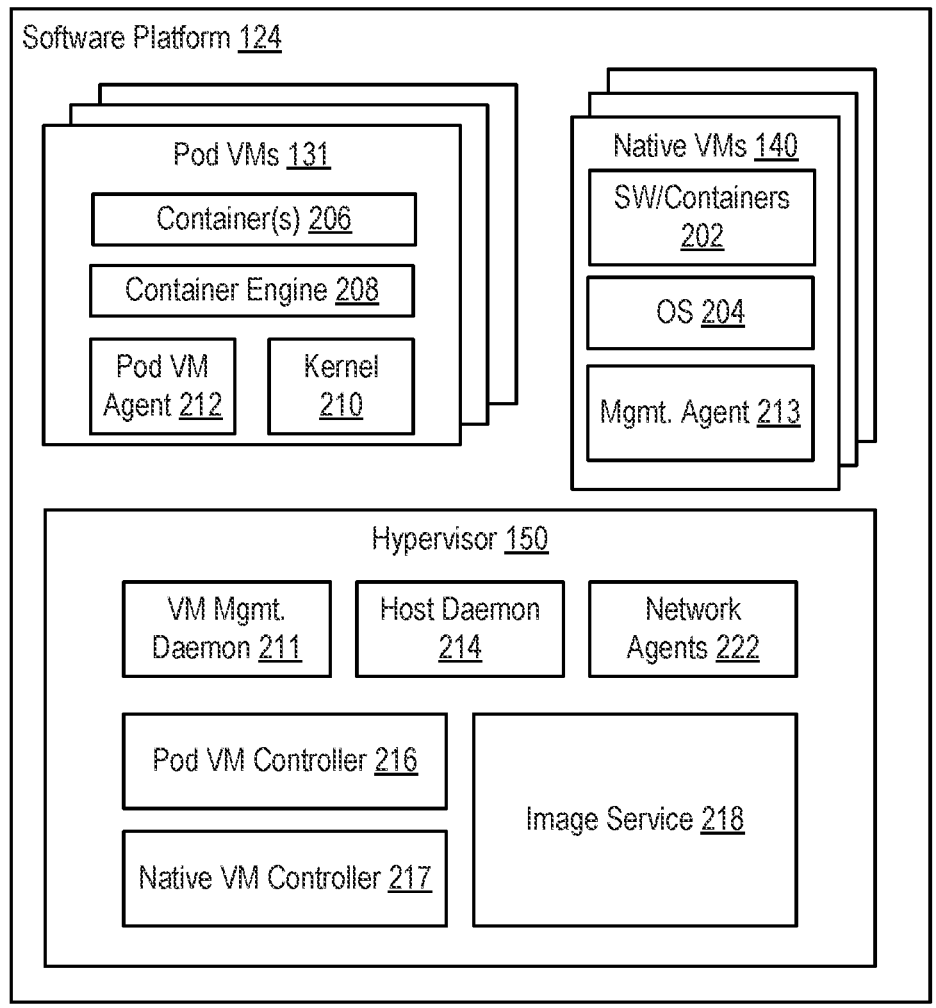
FIG. 2 is a block diagram depicting a software platform of a host in the virtualized computing system of FIG. 1 according an embodiment.

FIG. 2 is a block diagram depicting software platform 124 according an embodiment. As described above, software platform 124 of host 120 includes hypervisor 150 that supports execution of VMs, such as pod VMs 131 and native VMs 140. In an embodiment, hypervisor 150 includes a VM management daemon 211, a host daemon 214, a pod VM controller 216, a native VM controller 217, an image service 218, and network agents 222. VM management daemon 211 is an agent installed by virtualization management server 116. VM management daemon 211 provides an interface to host daemon 214 for virtualization management server 116. Host daemon 214 is configured to create, configure, and remove VMs (e.g., pod VMs 131 and native VMs 140).

Pod VM controller 216 is an agent of container orchestrator 177 and allows the master servers of container orchestrator 177 to interact with hypervisor 150. Pod VM controller 216 configures the respective host as a node in a Kubernetes cluster. Pod VM controller 216 manages the lifecycle of pod VMs 131, such as determining when to spin-up or delete a pod VM. Pod VM controller 216 also ensures that any pod dependencies, such as container images, networks, and volumes are available and correctly configured. In embodiments, native VM controller 217 is an agent of container orchestrator 177 and allows the master servers of container orchestrator 177 to interact with hypervisor 150 to manage lifecycles of native VMs 140 and applications executing therein. While shown separately from pod VM controller 216, in some embodiments both pod VM controller 216 and native VM controller 217 can be functions of a single controller. In other embodiments, native VM controller 217 can be omitted in case container orchestrator 177 does not manage native VMs 140.

Image service 218 is configured to pull container images from an image registry and store them in shared storage 170 such that the container images can be mounted by pod VMs 131 (or native VMs 140). Image service 218 is also responsible for managing the storage available for container images within shared storage 170. This includes managing authentication with the image registry, assuring providence of container images by verifying signatures, updating container images when necessary, and garbage collecting unused container images. Image service 218 communicates with pod VM controller 216 during spin-up and configuration of pod VMs 131/native VMs 140. In some embodiments, image service 218 is part of pod VM controller 216.

Network agents 222 comprises agents installed by network manager 112. Network agents 222 are configured to cooperate with network manager 112 to implement logical network services. Network agents 222 configure the respective host as a transport node.

Each pod VM 131 has one or more containers 206 running therein in an execution space managed by container engine 208. The lifecycle of containers 206 is managed b pod VM agent 212. Both container engine 208 and pod VM agent 212 execute on top of a kernel 210 (e.g., a Linux® kernel). A service 148 can execute in a container 206 or across multiple containers 206. A container 206 can execute one or more services 148. Each native VM 140 has software 202 running therein on top of an OS 204. Software 202 can execute directly on OS 204 (sometimes referred to as a guest OS) or within containers 202 managed by a container engine of OS 204. Software 202 can include one or more services 148.

Native VMs 140 do not include pod VM agents and are isolated from pod VM controller 216. Rather, native VMs 140 include management agents 213 that communicate with native VM controller 217. Container engine 208 (and any container engine in native VMs 140) can be an industry-standard container engine, such as libcontainer, runc, or containerd.

Figure 3:
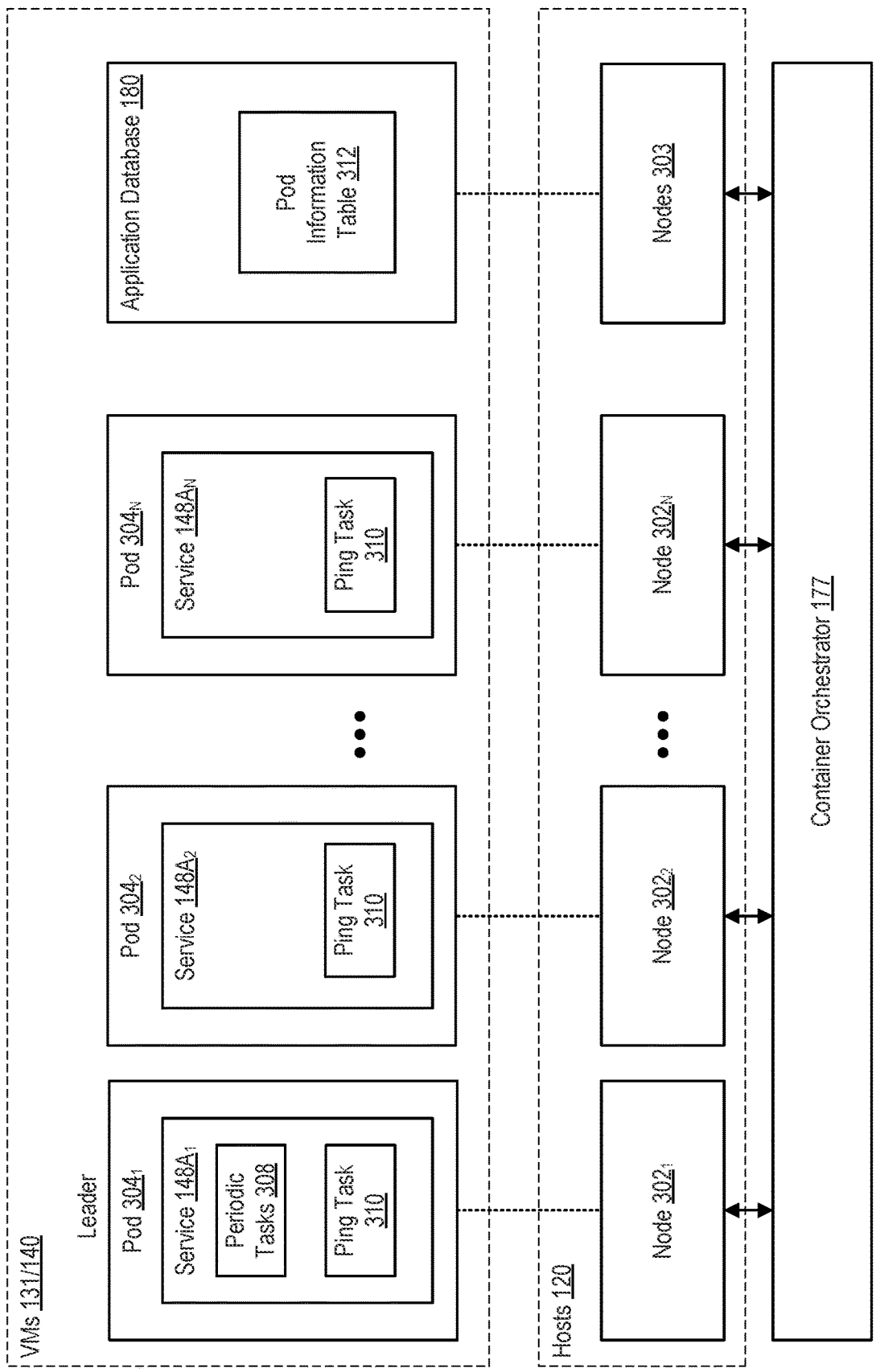
FIG. 3 is a block diagram depicting a service of an application replicated across a plurality of nodes according to embodiments.

FIG. 3 is a block diagram depicting a service 148A of application 147 replicated across a plurality of nodes 302 according to embodiments. In embodiments, each node $302_1 \ldots 302_N$ (collectively nodes 302 or plurality of nodes 302) is a host 120 in cluster 118, where N is an integer greater than one. For example, for N=3, container orchestrator 177 replicates service 148A across three nodes $302_1$, $302_2$, and $302_3$. Service 148A includes instances $148A_1 \ldots 148A_N$, each executing in a respective one of pods $304_1 \ldots 304_N$ (collectively pods 304 or plurality of pods 304). Each of pods 304 executes on a respective one of nodes 302. In embodiments, each of pods 304 comprises a pod VM 131 or a native VM 140. In embodiments, each instance of service 148A executes in one or more containers in its respective pod.

In embodiments, application database 180 is a service of application 147 replicated by container orchestrator 177 across a plurality of nodes 303 (e.g., three nodes 303). Application database 180 can execute in containers in VMs 131/140 (or as non-containerized software in VMs 140). Application database 180 can be implemented in a master/slave configuration, where one node 303 is the master node and other nodes 303 are the slave nodes. Application database 180 includes a pod information table 312. A ping task 310 of each service instance $148A_1 \ldots 148A_N$ persists pod information to, and reads pod information from, pod information table 312. Each of pods 304 has its own row in pod information table 312.

FIG. 4 is a block diagram depicting pod information table 312 according to embodiments. A schema of pod information table 312 includes columns for a pod ID 402, a last ping time 404, and a leader 406. The column for pod ID 402 can include numeric or string values. The column for last ping time 404 can include time/date values. The column for leader 406 can include Boolean values. The column for leader 406 can only have one row with the value of true (e.g., implemented by a unique index constraint or the like on the column). If one row in pod information table 312 includes a true value in the column for leader 406, application database 180 prevents the addition or modification of any row having a second true value in the column for leader 406.

Figure 5:
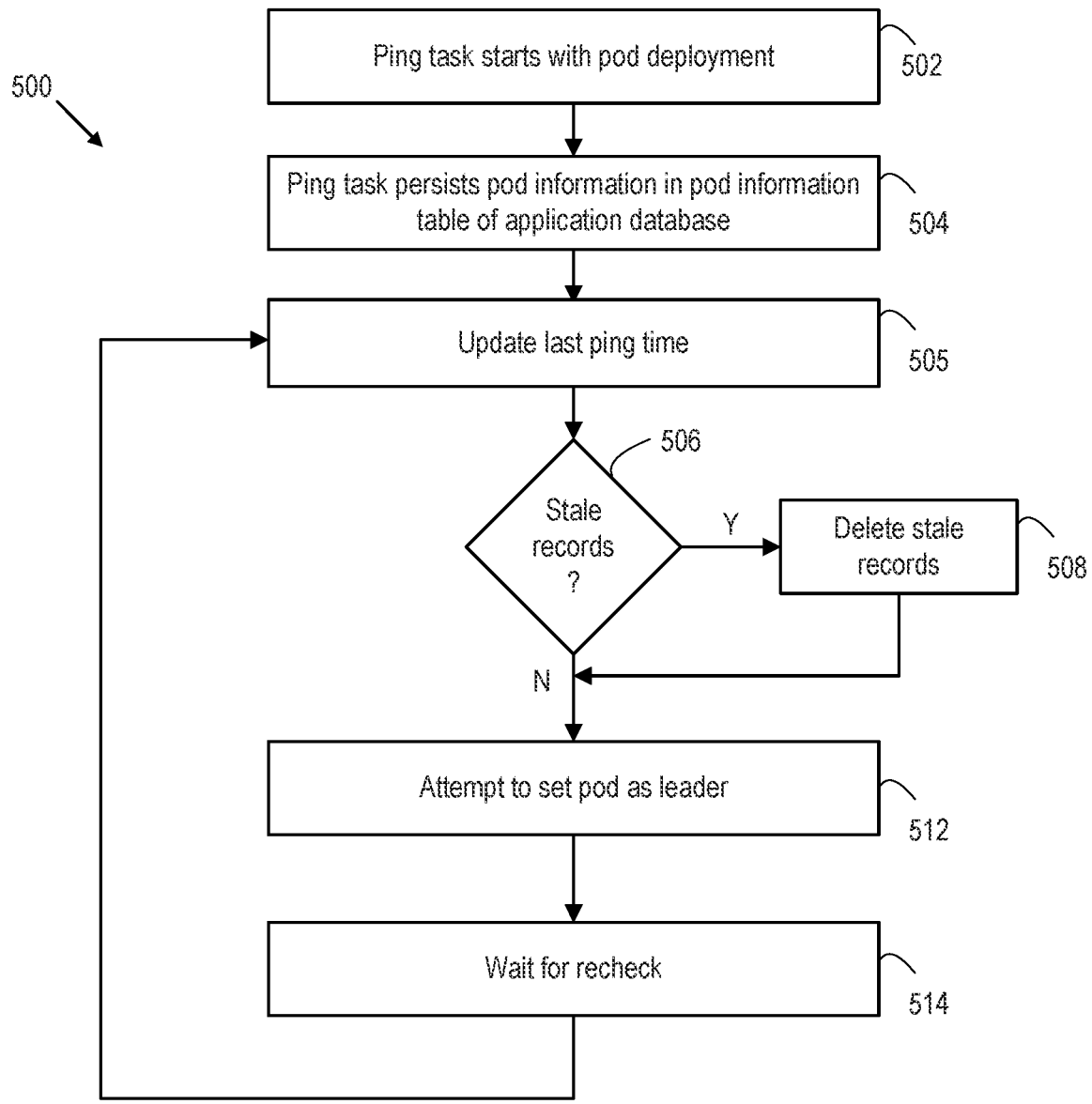
FIG. 5 is a flow diagram depicting a method of executing a ping task of a service instance according to embodiments.

FIG. 5 is a flow diagram depicting a method 500 of executing a ping task 310 of a service instance according to embodiments. Method 500 begins at step 502, where a ping task 310 starts with pod deployment. Container orchestrator 177 cooperates with a node (e.g., pod VM controller 216) to deploy a pod 304 to execute an instance of service 148A. Ping task 310 is a process or thread of the instance of service 148A and is started along with other tasks upon deployment of the pod. At step 504, ping task 310 persists pod information in pod information table 312 of application database 180. The pod information includes, in embodiments, a pod identifier (ID). Ping task 310 creates a row in pod information table 312 for its pod having the pod ID in the column for pod ID 402. At step 505, ping task 310 updates last ping time 404 in the row created in step 504 to the current time.

At step 506, ping task 310 determines if there are any stale records (rows) in pod information table 312. Ping task 310 can query pod information table 312 for all records having a last ping time older than the current time less a configurable threshold. The threshold is greater than the time it takes for ping task 310 to refresh the last ping time while the pod is active. For example, ping task 310 can query pod information table 312 for all records having a last ping time older than ten minutes (or any configurable time window). Thus, pod information table 312 has active pod records and potentially stale pod records. For example, if container orchestrator 177 removes a pod, its record will become stale in pod information table 312. If container orchestrator 177 restarts a pod, the restarted pod will have a new pod ID. Ping task 310 will then create a new row in pod information table 312 with this new pod. ID and the row with the previous pod ID prior to restart will become stale, in the example of FIG. 4, pods with pod iDs "pod 1," "pod 2," and "pod 3" are active pod records having last ping times T1, T2, and T3, respectively, within the threshold window of current time. Pods with pod IDs "pod 10," "pod 11," and "pod 12" are stale pod records having last ping times T10, T11, and T12, respectively, outside the threshold window of current time. If at step 506 ping task 310 identifies stale records, method 500 proceeds to step 508, where ping task deletes the stale records from pod information table 312. Otherwise, method 500 proceeds to step 512. Method 500 also proceeds to step 512 from step 508.

At step 512, ping task 310 attempts to set its pod be a leader. In embodiments, only one of pods 304 can be selected as the leader, which is indicated in pod information table 312 using leader 406. Ping task 310 attempts to set leader to true in the row of pod information table 312 for the pod. If another row in pod information table 312 is already true, then the pod for ping task 310 cannot be the leader and the operation is denied. If no other row in pod information table 312 has leader set to true, then the pod for ping task 310 can be the leader and the operation succeeds. Method 500 then proceeds to step 514. At step 514, ping task 310 waits for rechecking. Ping task 310 periodically checks pod information table for stale records and to see if it can become leader. After a threshold period, method 500 returns to step 505 from step 514. Ping task 310 refreshes the last ping time so that the record of the current pod does not become stale.

Figure 6:
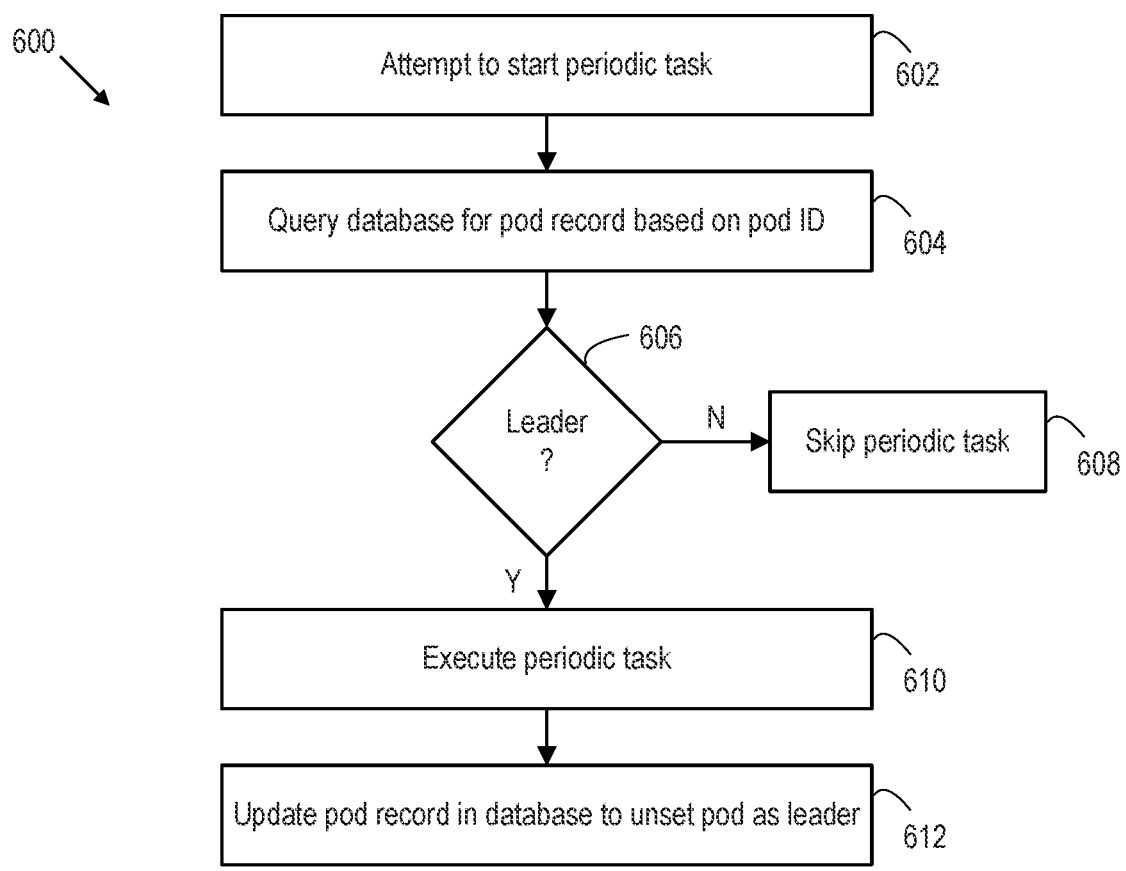
FIG. 6 is a flow diagram depicting a method of executing a periodic task of a service according to embodiments.

FIG. 6 is a flow diagram depicting a method 600 of executing a periodic task of a service 148 according to embodiments. In embodiments, periodic task(s) 308 of service 148A only execute in a pod that has been selected as the leader by ping task 310. Periodic task(s) 308 are not executed or are suspended on any of pods 304 that are not selected as the leader. In the example of FIG. 3, pod 304₁ is selected as the leader by its ping task 310 (e.g., pod ID "pod 3" in pod information table 312). Thus, periodic task(s) 308 of service instance 148A₁ are executing. Service instances 148A₂ . . . 148A_N do not execute periodic task(s) 308.

Method 600 begins at step 602, where a service instance 149A₁ . . . 149A_N tries to start a periodic task 308. At step 604, the service instance queries pod information table 312 in application database 180 for the pod record associated with its pod using the pod. ID. At step 606, the service instance determines if its pod is the leader based on the query result. If not, method 600 proceeds to step 608, where the service instance skips the periodic task (i.e., the periodic task is not executed). If at step 606 the pod is the leader, the method 600 proceeds to step 610. At step 610, the service instance executes the periodic task. At step 612, the service instance updates the pod's record in pod information table 312 to unset the pod as the leader. Step 612 is optional and can be performed to allow other pods to execute the periodic job on the next attempt, which can improve load distribution and performance.

Figure 7A:
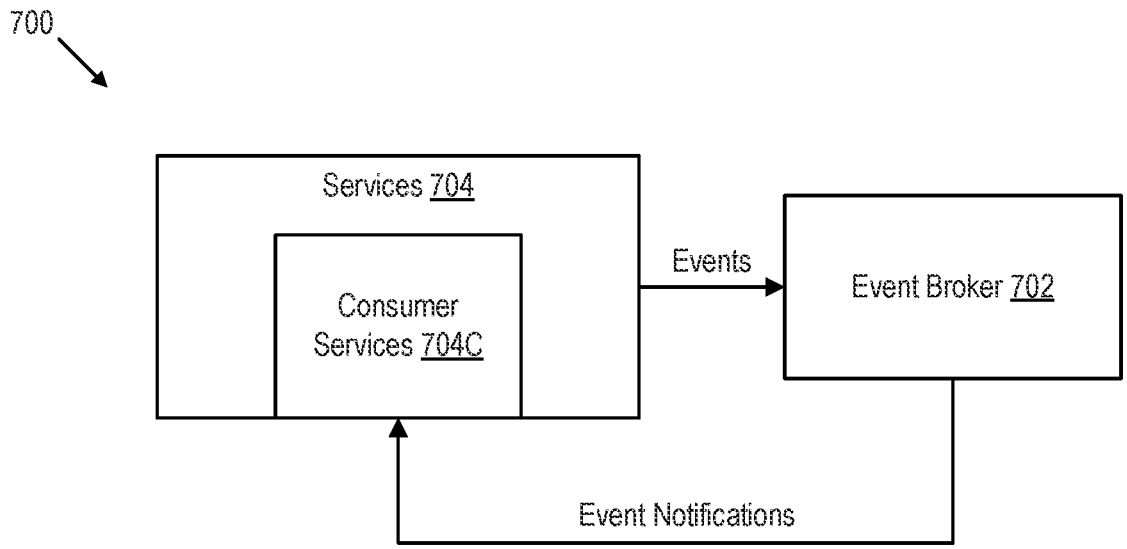
FIG. 7A is a block diagram depicting an application according to embodiments.

FIG. 7A is a block diagram depicting an application 700 according to embodiments. Application 700 includes services 704 and an event broker 702. Event broker 702 is also a service of application 700 and is configured to monitor for events generated by services 704. Event broker 702 sends event notifications to consumer services 704C of services 704 (e.g., services that subscribe to receive events).

Figure 7B:
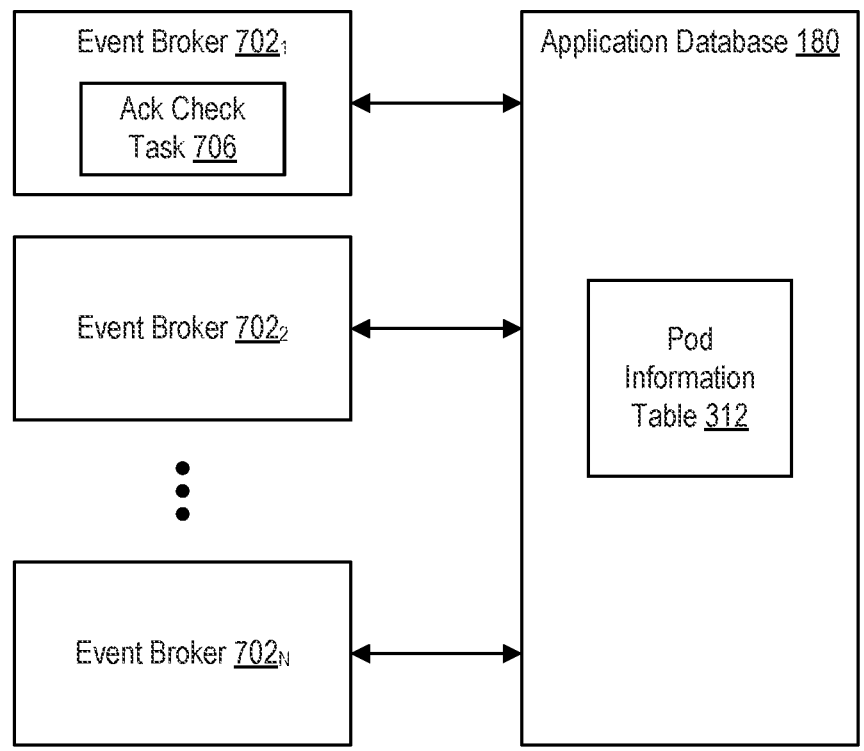
FIG. 7B is a block diagram depicting the replication of an event broker of the application of FIG. 7A according to embodiments.

FIG. 7B is a block diagram depicting the replication of the event broker according to embodiments. Event broker 702 includes instances 702₁ . . . 702_N, where N is an integer greater than one. Each instance of event broker 702 includes a ping task that functions as ping task 310 described above to select a leader. Event broker 702 has a periodic task to check for acknowledgement of events delivered to consumer services 704C ("ack check task 706"). If a consumer service 704C does not acknowledge receiving an event, ack check task 706 resends the event notification to the consumer service. It would be inefficient and potentially confusing to a consumer service 704C to receive multiple event notifications for the same event from multiple instances of ack check task 706. Thus, event broker 702 is configured to run only one instance of ack check task 706 on the leader instance.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of executing a periodic task of a service having service instances replicated across hosts in a cluster of a virtualized computing system, the service instances executing in pods implemented by virtual machines (VMs) on the hosts, the method comprising:
   persisting, by ping tasks of the service instances, records in a pod information table of a database, the records including pod identifiers of the pods and leader indicators, the database configured such that the leader indicator in only one of the records can be set to true;
   determining, by a first ping task of the ping tasks, a leaderless condition in that the leader indicator in each of the records is false;
   setting to true, by the first ping task in response to the leaderless condition, the leader indicator in a first record of the records having a first pod identifier of the pod identifiers for a first pod of the pods in which the first ping task executes; and
   executing the periodic task in the first pod to the exclusion of each other of the pods.

2. The method of claim 1, wherein the records include timestamps indicating time of last update by the ping tasks.

3. The method of claim 2, further comprising:
   querying, by the first ping task, the pod information table for at least one of the records the timestamp of which is older than a threshold time; and
   deleting, by the first ping task, the at least one record from the pod information table.

4. The method of claim 1, further comprising:
   setting to false, by the first ping task in response to execution of the periodic task in the first pod, the leader indicator in the first record.

5. The method of claim 1, further comprising:
   determining, by a second ping task of the ping tasks, a leader condition in that the leader indicator in the first record is true; and
   preventing execution of the periodic task in a second pod of the pods in which the second ping task executes in response to the leader condition.

6. The method of claim 1, wherein the virtualized computing system comprises a container orchestrator, wherein the container orchestrator cooperates with hypervisors in the hosts to deploy the VMs, and wherein the services instances execute in containers of the VMs managed by the container orchestrator.

7. The method of claim 1, wherein the service is one of a plurality of services of an application, and wherein the database is a component of the application configured to persist data for the plurality of services.

8. A non-transitory computer readable medium comprising instructions to be executed in a computing device to cause the computing device to carry out a method of executing a periodic task of a service having service instances replicated across hosts in a cluster of a virtualized computing system, the service instances executing in pods implemented by virtual machines (VMs) on the hosts, the method comprising:
   persisting, by ping tasks of the service instances, records in a pod information table of a database, the records including pod identifiers of the pods and leader indicators, the database configured such that the leader indicator in only one of the records can be set to true;
   determining, by a first ping task of the ping tasks, a leaderless condition in that the leader indicator in each of the records is false;
   setting to true, by the first ping task in response to the leaderless condition, the leader indicator in a first record of the records having a first pod identifier of the pod identifiers for a first pod of the pods in which the first ping task executes; and
   executing the periodic task in the first pod to the exclusion of each other of the pods.

9. The non-transitory computer readable medium of claim 8, wherein the records include timestamps indicating time of last update by the ping tasks.

10. The non-transitory computer readable medium of claim 9, further comprising:
    querying, by the first ping task, the pod information table for at least one of the records the timestamp of which is older than a threshold time; and
    deleting, by the first ping task, the at least one record from the pod information table.

11. The non-transitory computer readable medium of claim 8, further comprising:
    setting to false, by the first ping task in response to execution of the periodic task in the first pod, the leader indicator in the first record.

12. The non-transitory computer readable medium of claim 8, further comprising:
    determining, by a second ping task of the ping tasks, a leader condition in that the leader indicator in the first record is true; and
    preventing execution of the periodic task in a second pod of the pods in which the second ping task executes in response to the leader condition.

13. The non-transitory computer readable medium of claim 8, wherein the virtualized computing system comprises a container orchestrator, wherein the container orchestrator cooperates with hypervisors in the hosts to deploy the VMs, and wherein the services instances execute in containers of the VMs managed by the container orchestrator.

14. The non-transitory computer readable medium of claim 8, wherein the service is one of a plurality of services of an application, and wherein the database is a component of the application configured to persist data for the plurality of services.

15. A virtualized computing system, comprising:
a cluster of hosts; and
a service having service instances replicated across the hosts, the service instances implemented by virtual machines (VMs) on the hosts;
wherein a periodic task of the service is executed by:
persisting, by ping tasks of the service instances, records in a pod information table of a database, the records including pod identifiers of the pods and leader indicators, the database configured such that the leader indicator in only one of the records can be set to true;
determining, by a first ping task of the ping tasks, a leaderless condition in that the leader indicator in each of the records is false;
setting to true, by the first ping task in response to the leaderless condition, the leader indicator in a first record of the records having a first pod identifier of the pod identifiers for a first pod of the pods in which the first ping task executes; and
executing the periodic task in the first pod to the exclusion of each other of the pods.

16. The virtualized computing system of claim 15, wherein the records include timestamps indicating time of last update by the ping tasks.

17. The virtualized computing system of claim 16, wherein the periodic task is further executed by:
querying, by the first ping task, the pod information table for at least one of the records the timestamp of which is older than a threshold time; and
deleting, by the first ping task, the at least one record from the pod information table.

18. The virtualized computing system of claim 15, wherein the periodic task is further executed by:
setting to false, by the first ping task in response to execution of the periodic task in the first pod, the leader indicator in the first record.

19. The virtualized computing system of claim 15, wherein the periodic task is further executed by:
determining, by a second ping task of the ping tasks, a leader condition in that the leader indicator in the first record is true; and
preventing execution of the periodic task in a second pod of the pods in which the second ping task executes in response to the leader condition.

20. The virtualized computing system of claim 15, wherein the virtualized computing system comprises a container orchestrator, wherein the container orchestrator cooperates with hypervisors in the hosts to deploy the VMs, and wherein the services instances execute in containers of the VMs managed by the container orchestrator.

* * * * *